United States Patent [19]

Langhof et al.

[11] Patent Number: 5,213,002
[45] Date of Patent: May 25, 1993

[54] BEARING SYSTEM FOR A GEAR SHIFT LEVER

[75] Inventors: Rolf Langhof, Offenbach; Michael Schütz, Rimbach, both of Fed. Rep. of Germany

[73] Assignee: Firma Carl Freudenberg, Weinheim/Bergstr., Fed. Rep. of Germany

[21] Appl. No.: 748,689

[22] Filed: Aug. 21, 1991

[30] Foreign Application Priority Data

Aug. 23, 1990 [DE] Fed. Rep. of Germany ....... 4026652

[51] Int. Cl.⁵ .............................................. B60K 20/00
[52] U.S. Cl. ...................... 74/473 P; 74/543; 403/130; 403/133
[58] Field of Search ........... 74/473 P, 543; 384/203, 384/222; 403/128, 130, 131, 132, 133, 140

[56] References Cited

U.S. PATENT DOCUMENTS

| | | | |
|---|---|---|---|
| 1,852,979 | 4/1932 | Moorhouse | 74/473 P |
| 2,100,642 | 11/1937 | Geyer | 74/473 P |
| 2,174,504 | 9/1939 | Cole | 74/473 P |
| 2,606,795 | 8/1952 | Hutton | 384/203 |
| 4,334,795 | 6/1982 | Westphal | 403/140 X |
| 4,492,130 | 1/1985 | Lamy et al. | 74/473 P |
| 4,565,107 | 1/1986 | Müller | 74/473 P |
| 4,629,352 | 12/1986 | Nemoto | 403/131 X |

FOREIGN PATENT DOCUMENTS

| | | |
|---|---|---|
| 505978 | 8/1930 | Fed. Rep. of Germany ...... 403/131 |
| 2460769 | 12/1974 | Fed. Rep. of Germany . |
| 3341878 | 5/1985 | Fed. Rep. of Germany .... 74/473 P |

Primary Examiner—Allan D. Herrmann
Assistant Examiner—David W. Laub
Attorney, Agent, or Firm—Kenyon & Kenyon

[57] ABSTRACT

A bearing system for a gear shift lever, which is held in a shift ball and surrounded by an assembly flange. An intermediate layer shaped in the form of a ring, which acts as insulation for vibrations, is arranged between the shift ball and the gear shift lever.

11 Claims, 1 Drawing Sheet

BEARING SYSTEM FOR A GEAR SHIFT LEVER

BACKGROUND OF THE INVENTION

The invention relates generally to a bearing system for a gear shift lever, and more particularly, to one of the type in which a shift ball is surrounded by an intermediate layer shaped in the form of a vibration insulating ring, which in turn is surrounded by an assembly flange.

A bearing system of the general type stated is set forth in DE-OS 24 60 769. The intermediate layer, shaped in the form of a ring for providing insulation from vibrations, is arranged between the ball cage and the assembly flange.

The invention is directed towards the problem of further developing such a bearing system so as to achieve a higher degree of insulation from vibrations of the gear shift lever relative to the assembly flange.

SUMMARY OF THE INVENTION

This invention solves this problem with a bearing system having a gear shift lever surrounded by an elastic layer intermediate the lever and a shift ball. The ball is nested within a ball cage, which is connected via a spring element to an assembly flange.

In the bearing system according to the invention, the intermediate layer is arranged between the gear shift lever and the shift ball. This results in a relative reduction in the amount of rubber elastic material required for its production, which helps reduce costs. Furthermore, because of the specifically increased cross-sectional stress, one achieves a comparatively improved degree of deformability, which helps improve the degree of vibration insulation of the gear shift lever with respect to the assembly flange.

The intermediate layer is generally made of rubber having a Shore A hardness of between 30 and 60. Within this range, it has proven to be advantageous to use rubber having a Shore A hardness of between 40 and 50. The intermediate layer is connected along its outer surface to the shift ball, and along its inner surface to the gear shift lever. The connection may be accomplished in an adhesive manner, as for example by directly vulcanizing the intermediate layer on. When using a corresponding attachment method, it is practical to give the intermediate layer a shape which promotes elastic deformations. To achieve this purpose, the intermediate layer may be provided with recesses distributed in the circumferential direction, for example, extending parallel to the longitudinal direction of the gear shift lever.

The elastic intermediate layer can be delimited in the radial direction towards the inside and the outside by surfaces which extend parallel to one another. Alternatively, one may use any desired structure for the intermediate layer, depending upon the specific conditions of the intended application. In general, surfaces having a cylindrical structure have proven to be easy to manufacture and advantageous to use in terms of vibration technology.

The use of spherically structured surfaces promotes insulation of the shift lever from vibration in the statically unstressed state. In contrast, a conical surface structure is recommended in applications where a static prestress is expected under normal operating conditions.

The intermediate layer can have a wall thickness that increases in the radial direction as one moves axially along the gear shift lever. This results in improved vibration insulation in the direction of increasing intermediate layer wall thickness. This can be used to effectively counteract the occurrence of resonance vibrations of the shift lever.

Embodiments of this type, in which the intermediate layer has a wall thickness that increases in the radial direction as one moves in the axial direction towards the top, allow for the problem-free absorption of significant static prestress. This is in contrast to other possible embodiments, in which the intermediate layer has a wall thickness that increases in the radial direction as one moves axially towards the bottom, which are characterized by especially good vibration insulation where stress due to secondary forces occurs during regular use. Such a regime can typically be due to the force of the user's hand placed on the lever.

DETAILED DESCRIPTION OF THE INVENTION

Figure 1:
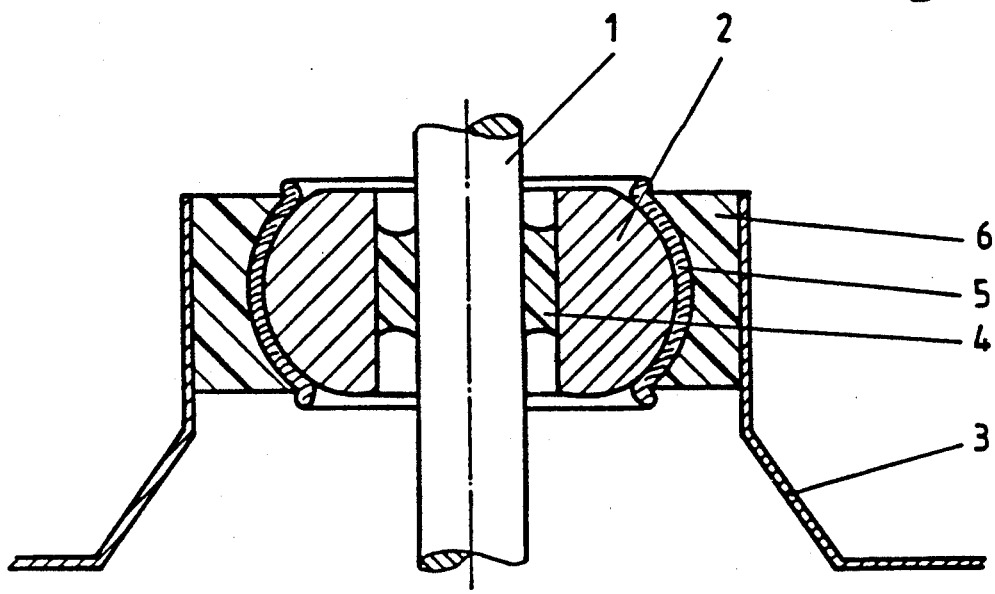
FIG. 1 shows the bearing system represented in longitudinal cross-section.

FIG. 1 depicts bearing system for a gear shift lever 1 in longitudinal cross-section. The gear shift lever 1 is held in a shift ball 2 made of a metallic material, and is surrounded by an assembly flange 3, which can be connected with the body of a motor vehicle. The shift ball 2 in turn is mounted in a relatively rotatable manner in a ball cage 5 made of a polymeric material, which in turn is supported on the assembly flange 3 by a spring element 6 having a ring-shaped structure.

Between the gear shift lever 1 and the shift ball 2 is an intermediate layer 4 made of a rubber-like material. This material may have a Shore A hardness of 45 (midway in the preferred range of 40-50, as noted above). This intermediate layer is connected along its inner surface with the shift lever 1, and along its outer surface with the shift ball 2, by being directly vulcanized thereon. It is of shorter axial length than the shift ball 2, and imparts excellent relative mobility to the shift lever 1 with respect to the assembly flange 3. The shift lever 1 is therefore well insulated from any vibrations introduced to it via the assembly flange 3 during normal use. Hence, such vibrations can no longer make themselves felt on the shift lever 1 in a disruptive manner.

Figure 2:
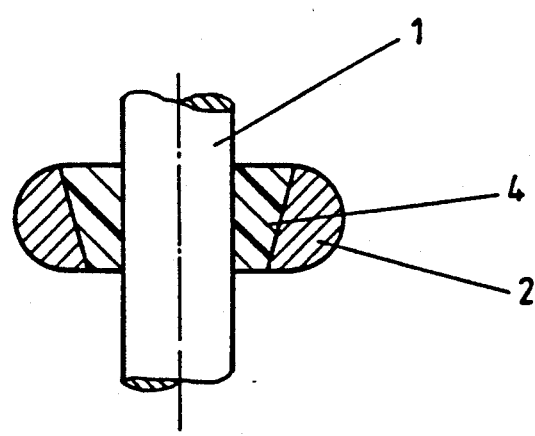
FIGS. 2 and 3 show two partial segments of the gear shift levers having different structure.

FIG. 2 shows a segment of a shift lever represented in longitudinal cross-section, in which the intermediate layer is delimited by a cylindrical surface on the inward facing side in the radial direction, and by a conical surface on the outward facing side in the radial direction. The intermediate layer is arranged in such a manner that it has a wall thickness which increases vertically towards the top. This enables it to effectively absorb static prestress that is introduced vertically from above.

Figure 3:
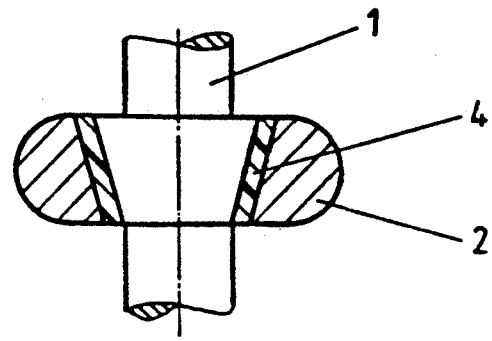

FIG. 3 shows an embodiment in which the intermediate layer 4 is delimited in the radial direction, on the inside and the outside, by conical surfaces which extend parallel to one another. This shape causes the intermediate layer to have a uniform wall thickness over its entire axial length. High static prestress, which is introduced in the vertical direction from above, can be absorbed in an excellent manner by such an intermediate layer without any noteworthy relative displacements of the shift lever 1' relative to the shift ball 2'. Nevertheless, the shift ball 2' is still well insulated from the gear shift lever 1' in terms of vibrations.

What is claimed is:

1. A bearing system for a gear shift lever, comprising:
   a gear shift lever;
   an ring-shaped intermediate layer surrounding and being in contact with the gear shift lever, said intermediate layer having a top surface, a bottom surface, and an uninterrupted outer surface therebetween and insulating the gear shift lever from vibrations, said outer surface being cylindrical or conical in shape;
   a shift ball having an inner surface that is configured to mate with the outer surface of the intermediate layer, said shift ball surrounding and in contact with the full extent of the uninterrupted outer surface of the intermediate layer so that the inner surface of the shift ball is spaced from the gear shift lever by the intermediate layer and the gear shift lever does not directly contact the shift ball; and
   an assembly flange surrounding the shift ball.

2. The gear shift lever according to claim 1, wherein the intermediate layer is made of rubber with a Shore A hardness of between 30 and 60.

3. The gear shift lever according to claim 1, wherein the intermediate layer is made of rubber with a Shore A hardness of between 40 and 50.

4. The gear shift lever according to claim 1, wherein the intermediate layer is defined in the radial direction by inner and outer surfaces which extend parallel to one another.

5. The gear shift lever according to claim 4, wherein the inner and outer surfaces are cylindrical.

6. The gear shift lever according to claim 4, wherein the shift ball has an outer surface that is arcuate in cross-section.

7. The gear shift lever according to claim 4, wherein the surfaces are structured conically.

8. The gear shift lever according to claim 1, wherein the intermediate layer has a wall thickness which increases in the radial direction as a function of axial position in at least one direction.

9. The gear shift lever according to claim 8, wherein the intermediate layer has an upper end and a central axis of symmetry and further has a radial wall thickness that increases only in the axial direction towards the upper end.

10. The gear shift lever according to claim 8, wherein the intermediate layer has a lower end and a central axis of symmetry and further has a radial wall thickness that increases only in the axial direction towards the lower end.

11. A bearing system for a gear shift lever, comprising:
    a gear shift lever;
    a ring-shaped intermediate layer having vibration insulative properties and having a top surface, a bottom surface, an inner surface and an uninterrupted cylindrically or conically shaped outer surface that extends between the top and bottom surfaces, said inner surface being in contact with the gear shift lever, said intermediate layer insulating the gear shift lever from vibrations;
    a shift ball having an inner surface that is configured to mate with the outer surface of the intermediate layer, said shift ball surrounding and in contact with the outer surface of the intermediate layer so that the inner surface of the shift ball is spaced from the gear shift lever by the intermediate layer and the gear shift lever does not directly contact the shift ball;
    a ball cage having an inner surface and an outer surface, said inner surface being in abutting relation with the shift ball;
    a spring element surrounding and contacting the outer surface of said ball cage; and
    an assembly flange surrounding said spring element.

* * * * *